United States Patent
Stiernspetz et al.

[11] Patent Number: 5,378,886
[45] Date of Patent: Jan. 3, 1995

[54] MAGNETIC HEAD DRIVE DEVICE HAVING A COGGED BELT

[75] Inventors: Allan Stiernspetz, Vikingstad; Tor Kagebeck, Linköping, both of Sweden

[73] Assignee: ICL Systems Aktiebolag, Kista, Sweden

[21] Appl. No.: 39,395

[22] PCT Filed: Aug. 20, 1992

[86] PCT No.: PCT/SE92/00564

§ 371 Date: May 25, 1993

§ 102(e) Date: May 25, 1993

[87] PCT Pub. No.: WO93/04469

PCT Pub. Date: Mar. 4, 1993

[30] Foreign Application Priority Data

Aug. 23, 1991 [SE] Sweden .................. 9102433

[51] Int. Cl.⁶ .................................................. G06K 7/08
[52] U.S. Cl. ........................................ 235/449; 360/101
[58] Field of Search .................... 235/475, 449; 360/2, 360/101

[56] References Cited

U.S. PATENT DOCUMENTS

| | | | |
|---|---|---|---|
| 2,951,118 | 8/1960 | Shahbender | 360/101 |
| 3,731,061 | 5/1973 | Laybourn | 235/61.11 D |
| 3,818,500 | 6/1974 | Lemelson | 360/2 |
| 4,040,097 | 8/1977 | Mizuno | 360/2 |
| 4,907,098 | 3/1990 | Ohkoda | 360/2 |

FOREIGN PATENT DOCUMENTS 0203788 12/1986 European Pat. Off. .
2056852 5/1972 Germany .

*Primary Examiner*—Davis L. Willis
*Assistant Examiner*—Karl D. Frech
*Attorney, Agent, or Firm*—Ladas & Parry

[57] ABSTRACT

A drive device for a magnetic head (6) reciprocally movable in a slot (8) in a bank printer is suspended on a driving cogged belt (1), the cogged side of which at the same time serving as a covering for the slot to prevent the front edge of an inserted document from catching in the slot (8) in the document-supporting surface (7). The cogged belt can run with its smooth snide over smooth rollers (2, 3) at either end of the slot.

5 Claims, 1 Drawing Sheet

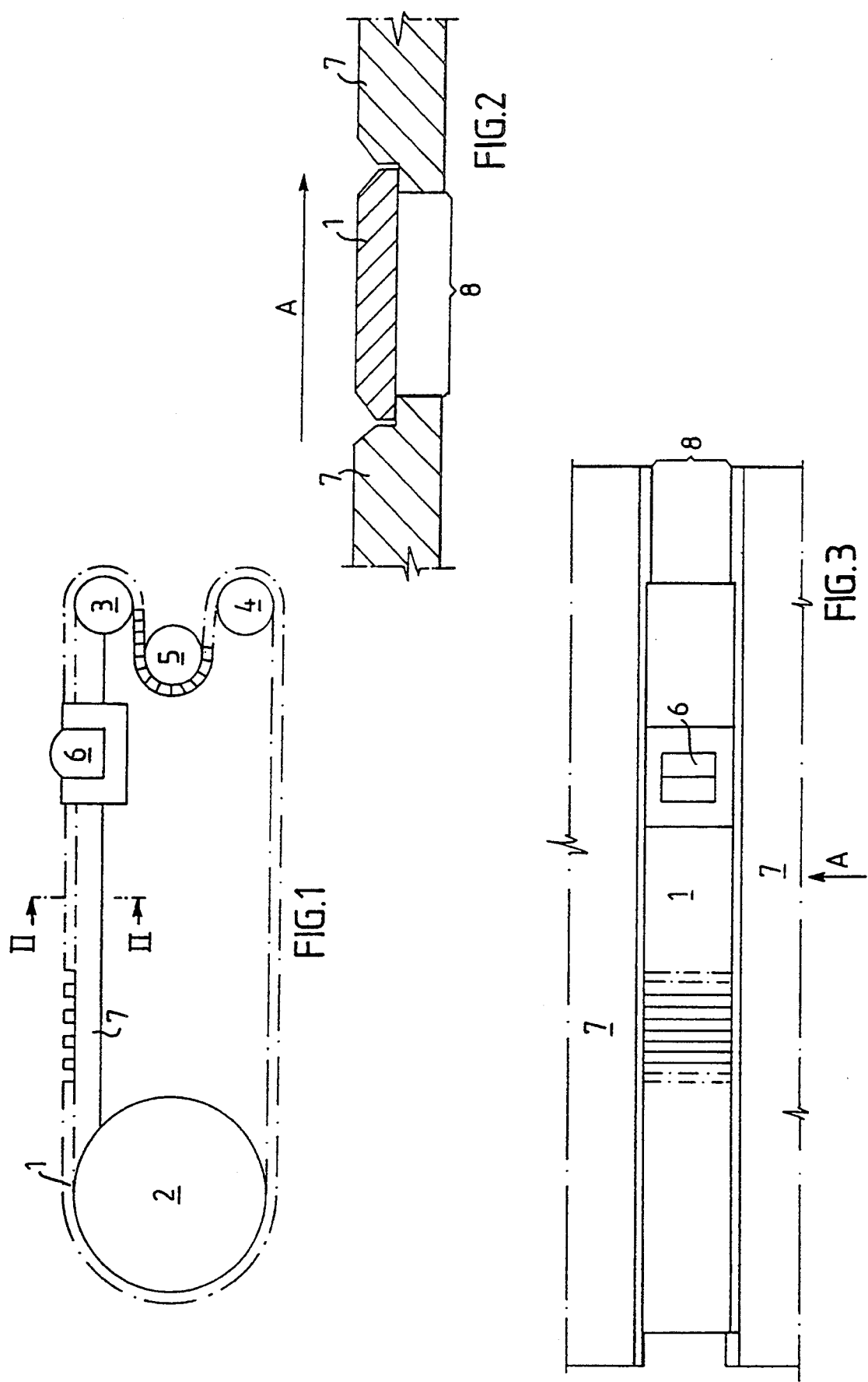

MAGNETIC HEAD DRIVE DEVICE HAVING A COGGED BELT

FIELD OF THE INVENTION

The present invention relates to a drive device for a magnetic head for reading and/or recording magnetic data on a document or the like, said magnetic head being driven reciprocally in a slot in a document supporting surface substantially perpendicularly to the feeding direction of the document.

Such drive devices are used in banks, e.g. in ink printers provided with a moving magnetic head which reads and stores information on a magnetic strip on the reverse side of a bank document inserted into the printer. The plate on which the document rests has a slot perpendicular to the feeding direction of the document. The magnetic head sweeps back and forth in the slot across the reverse side of the document. In such devices, the document is stationary while the printer device and the magnetic head move on either side of the document perpendicularly to the feeding direction of the document. This creates a number of problems. One must make sure that the forward edge or corner of the document, even if it happens to be folded downwards, will not catch in the slot when the document is fed in.

BACKGROUND

One solution to this problem which has been used in such printers during the last 15 years has been a helical spring disposed in the slot and provided with eight evenly distributed plastic elements for example, to prevent the front edge of the document from entering the slot. The helical spring is suspended between the magnetic head and one end of the slot. In the home position of the magnetic head for feeding the document into or out of the printer, i.e. when the magnetic head is at the other end of the slot, the helical spring is at: its maximum extent and the spacing between the plastic elements is also at a maximum. When the magnetic head is at its other end position, the spring assumes its shortest length and the plastic elements are packed tightly together at one end of the slot, and this reduces the potential length of stroke of the magnetic head in the slot by about one third. This design has proved complicated and expensive. The mounting of the spring and the plastic elements spaced thereon is quite labour-consuming.

Another unsolved problem in this context has been to achieve a positive non-slipping but at the same time smooth reciprocal movement of the magnetic head. In the previous design described above with a helical spring and plastic elements, it was necessary to fix the drive belt to the lower portion of the magnetic head, and this gave rise to a certain amount of stick-slip movement.

An object of the present invention is to achieve a drive device of the type in question which solves these problems.

SUMMARY OF THE INVENTION

Such a device is achieved according to the invention in a device of the type described by way of introduction which is characterized in that the magnetic head is mounted in an endless cogged belt running in and covering the slot, said belt having a flat side and a cogged side, the latter facing outwards, the cogs in the part of the belt in the slot having top surfaces lying essentially in the same plane as the supporting surface, the contact surface of the magnetic head being in proximity to said plane.

In addition to the advantages mentioned above, the drive device according to the invention is quite inexpensive to manufacture.

According to a preferred embodiment of the invention, the smooth inside of the cogged belt runs over smooth rollers mounted at either end of the slot. This provides very smooth operation due to the fact that the portion of the belt which is in the slot is tensioned by means of smooth surfaces on the belt and on the rollers, at the same time as positive, non-slip drive can be achieved by means of a cogged belt drive wheel remote from the slot.

A cogged belt according to the invention which is sufficiently thick for bevelling can run easily and evenly over a reversing roller since the spacing between the top surfaces of the cogs can increase when the belt passes over the reversing roller by virtue of the fact that the belt is only held together at its inner smooth side.

The invention will now be described as an example with reference to the accompanying drawings, wherein:

BRIEF DESCRIPTION OF THE DRAWINGS

FIG. 1 shows schematically the drive device according to the invention in section, FIG. 2 shows a section on a larger scale along the line II—II in FIG. 1, and FIG. 3 is a view from above of the drive device shown in FIG. 1.

DETAILED DESCRIPTION

FIGS. 1 and 3 show a magnetic head 6 for reading and recording magnetic data on the reverse side of a bank-book for example. The magnetic head is suspended in a cogged belt for reciprocal movement in a slot 8 in a supporting plate 7 for a document inserted for printing text on the front side of the document, e.g. in a bank printer. In order to achieve smooth movement of the magnetic head, the cogged belt 1 runs over smooth rollers 2, 3 and 4 with its smooth side and is driven by a cogged wheel 5 in engagement with the cogs of the belt 1 by means of an electronically controlled drive motor (not shown).

The drive belt also serves the function of covering the slot 8 in the supporting plate 7 for a document inserted into the printer in the direction of the arrow A in FIGS. 2 and 3. As can be seen most clearly in FIG. 2, the cogged belt covers the entire slot 8 in the supporting plate 7 and thus prevents an edge of an inserted document from entering the slot 8. Both the belt cogs and the edges of the slot can be bevelled to make it even more difficult for a document to catch between the edge of the slot and the belt 1. The width of the cogged belt can be reduced in that portion which does not cover the slot.

By turning the driving cogged side of the belt outwards and using it as a covering surface, it has been possible to achieve the above advantages in an inexpensive and reliable design.

The invention has thus solved a series of problems with a simple and ingenious design. All of the complicated designs which have been used previously become thereby superfluous.

What is claimed is:

1. Drive device for a magnetic head for reading and/or recording magnetic data on a document or the like, said magnetic head being driven reciprocally in a slot in a document-supporting surface (7), substantially perpendicularly to the feeding direction (A) of the documents, characterized in that the magnetic head (6) is mounted on an endless cogged belt running in and covering the slot (8), said belt having a smooth side and a cogged side, the latter facing outwards, the cogs in the portion of the belt (1) in the slot (8) having top surfaces lying essentially in the same plane as the supporting surface (7), said magnetic head (6) having a contact surface in proximity to said plane.

2. Drive device according to claim 1, characterized in that the smooth inside of the cogged belt runs over smooth rollers at either end of the slot.

3. Drive device according to claim 1, characterized in that the cogs of the belt have bevelled or rounded edges.

4. Drive device according to claim 1, characterized in that the slot edges adjacent the belt are bevelled.

5. Drive device according to claim 3 characterized in that the slot edges adjacent the belt are bevelled.

* * * * *